United States Patent

Mozzo

[11] Patent Number: 5,218,526
[45] Date of Patent: Jun. 8, 1993

[54] OPTIMIZATION OF PROCESS/PROPERTY/COMPOSITIONAL PARAMETERS

[75] Inventor: Gilbert Mozzo, Saint-Germain au Mont d'Or, France

[73] Assignee: Atochem, Puteaux, France

[21] Appl. No.: 617,183

[22] Filed: Nov. 23, 1990

[30] Foreign Application Priority Data

Nov. 23, 1989 [FR] France ................................ 89 15413

[51] Int. Cl.$^5$ ............................................. G05B 13/02
[52] U.S. Cl. .................................... 364/152; 364/153; 364/148
[58] Field of Search ............... 364/152, 153, 154, 148, 364/581

*Primary Examiner*—Jerry Smith
*Assistant Examiner*—Paul Gordon
*Attorney, Agent, or Firm*—Burns, Doane, Swecker & Mathis

[57] ABSTRACT

The process parameters of a variety of industrial processes and/or the properties and characteristic formulation of a given composition are optimized by means of a succession of hypercubes of $2^k$ vertices, with k representing the number of variables, and wherein the successive value of the variables and the resulting final properties are calculated algorithmically.

6 Claims, 3 Drawing Sheets

Fig. 9
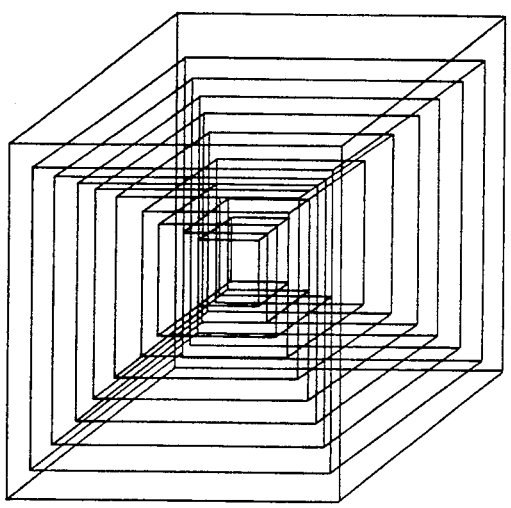
Fig. 11
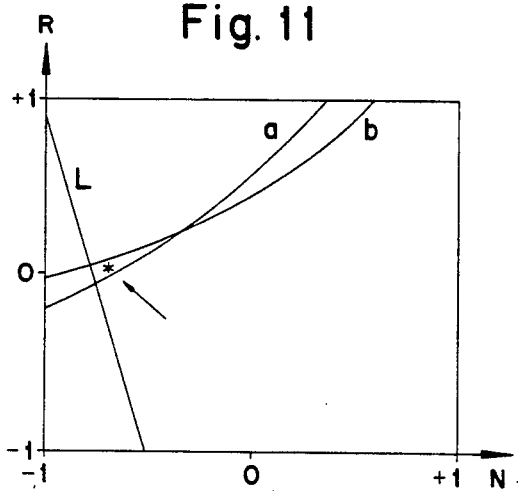
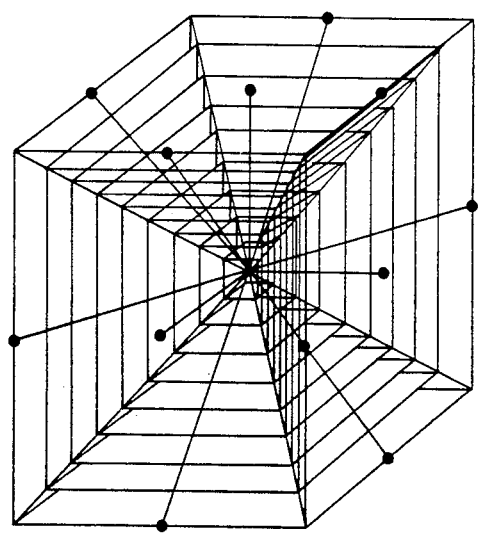
Fig. 10
Fig. 12
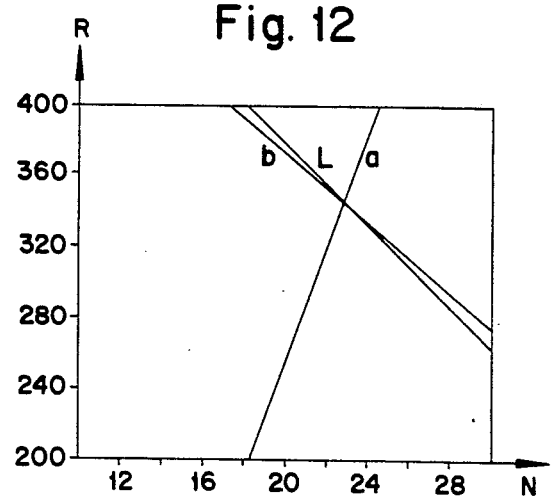

OPTIMIZATION OF PROCESS/PROPERTY/COMPOSITIONAL PARAMETERS

BACKGROUND OF THE INVENTION

1. Field of the Invention

The present invention relates to optimizing the operating conditions and/or properties in a process and/or composition entailing k variables, or parameters x, affecting p properties Y.

2. Description of the Prior Art

The various industrial processes include a large number of variables, notably the compositional profiles of the starting materials and/or the characteristic operating conditions, or process parameters, designed to provide the intended results.

Typically, a primary or predominant feature of the process is sought to be identified and then the best combination of variables is sought to be determined in order to optimize the desired final results. Obviously, the situation is rendered increasingly complex by an increasing number of variables, if the number of properties sought to be optimized also increases. If one should attempt to spatially correlate the variables in order to evaluate their effect on a plurality of properties, even with the use of information or data processing, the amount of computing time increases exponentially, rendering the analysis impossible. For example, to provide a degree of precision of $10^{-3}$ over the range of variation using a microprocessor, the computing rate of which is 5/100 of a second per point calculated, it is found that for a complete computation involving 4 variables, $10^{12}$ elementary calculations must be made (1,000 levels for each variable, then a combination of all possible levels of all of the variables), which translates into 1,600 years of microprocessor operation.

SUMMARY OF THE INVENTION

Accordingly, a major object of the present invention is the provision of improved technique for determining the optimum variables/properties relationship, while at the same time maintaining the time required for carrying out the full range of computations within predetermined manageable limits.

Another object of the present invention is the provision of improved technique for optimizing the process variables/properties relationship by predetermining the number of elementary calculations required to be made and, thus, the amount of time necessary to arrive at the desired solution.

Briefly, the present invention features a technique for determining the optimum variable/property relationship in a process and/or composition involving k variables X, affecting properties Y, such technique comprising the following unit operations:

(a) establishing response equations from an experimental design and/or by the analysis of the given data:

$$\underline{Y_j} = f(u_i)$$

(b) selecting a value $Y_j^*$ (c) calculating the minimum value of $$\delta^2 = \sum_1^j (v_j - v_j^*)^2$$

wherein $Y_j$ is the numerical value of the property Y of number j, $Y_j^*$ is the weighted value of $Y_j$ (intended value), $\underline{Y_j}$ is the weighted value of $Y_j$ given by the regression model $f(u_i)$, $v_j^*$ is the coded weighted value of $Y_j^*$, $v_j$ is the coded weighted value of $\underline{Y_j}$, $u_i$ is the coded weighted value of the variable with the numerical value X of number i ($X_i$), and said weightings having been determined by the equations:

$$v_j = 2 \frac{Y_j - \overline{Y_j}}{Y\max - Y\min}$$

and $$u_i = 2 \frac{X_i - \overline{X_i}}{X\max - X\min}$$

with $\overline{Y_j}$ designating the mean value of the property and $\overline{X_i}$ the mean value of the variable, Y max and Y min designating the actual extreme values of the properties over the experimental range, X max and X min designating the actual extreme values of the variables over the experimental range, $Y_j$ designating the actual value of the property and $X_i$ the actual value of the variable, said determination being characterized in that it entails creating a hypercube of coded variables constituting the experimental range, $v_j$ for the values of $u_i$ corresponding to the $2^k$ vertices of the hypercube, the dimensions of which are a fraction of the dimensions of the variables coded in stage 1, then $\delta^2$, with the vertex yielding the lowest value of $\delta^2$ becoming the center of a new hypercube, the dimensions whereof again being a fraction of the dimensions of the preceding hypercube, and repeating the above sequence until the minimum value of $\delta^2$ is obtained.

BRIEF DESCRIPTION OF THE DRAWINGS

FIGS. 9 and 10 are representations of nested cubes with FIG. 10 also showing centers of the edges and the centers of the faces;

FIGS. 11 shows the superposition of three isoresponses with the arrow point designating the desired result in accordance with one aspect of the invention; and FIG. 12 shows isoresponse curves in accordance with another aspect of the invention wherein sensitivity of tint to small variations in concentration and the necessity for calculating with extreme precision due to a small angle between planes b and L is illustrated.

DETAILED DESCRIPTION OF THE PREFERRED EMBODIMENTS OF THE INVENTION

Figure 1:
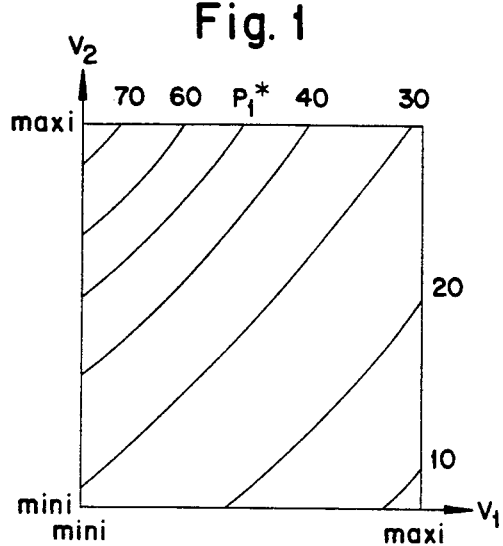
FIGS. 1 to 3 show conventional calculations.

More particularly according to the present invention, for obvious reasons of simplicity and in order to facilitate comprehension, the hypercube of the experimental range may have the dimensions of $-1$ and $+1$, the first calculated hypercube than having the dimensions of $-\frac{1}{2}, +\frac{1}{2}$, the second calculated hypercube having the dimensions $-\frac{1}{4}, +\frac{1}{4}$ and successively continuing, always taking one-half of the dimensions of the preceding hypercube.

In carrying out the determination according to the invention, the successive values of $u_i$ may be calculated by means of the algorithm ($A_1$):

$$u_i = c_i + \frac{D}{2^R} \cdot \frac{1}{N} \left[ E \frac{n-1}{p^k} + 1 \right] \cdot$$

$$\cos\left[\left(E\frac{n-1}{p^{i-1}} + (p-2)E\frac{n-1}{p^i}\right) \cdot \frac{\pi}{p-1}\right]$$

wherein $c_i$ designates the coordinates of the center of the hypercube R where the calculations are made; $D/2^4$ designates the amplitude of the partial calculation in the iteration of the order R, with D designating the distance of the calculation from the center of the experimental hypercube, R corresponding to the order of the successive iterations and, therefore, taking the values of 1, 2, 3 ... $R_{max}$;

$$\frac{1}{N}\left[E\frac{n-1}{p^k} + 1\right]$$

designates the dimensioning of the nested hypercubes in the space R, with N designating the number of nested hypercubes, E indicating that only the integer part of the following fraction is retained, k designating the number of variables considered, n representing the step of calculation in each hypercube R and varying from 1 to $Np^k$, with p designating the number of points calculated at each edge of the hypercube:

$$\cos\left[\left(E\frac{n-1}{p^{i-1}} + (p-2)E\frac{n-1}{p^i}\right) \cdot \frac{\pi}{p-1}\right]$$

designating the coordinates of each point explored in the nested hypercubes, E being as defined above and i designating the number of the variable, varying from 1 to k.

If the calculations are carried out from the center of the experimental range, $C_i-=0$ is taken as the first iteration (R=1).

If the calculations are effected beginning at another point:

$$c_i = \frac{BS + BI}{X_{max} - X_{min}}$$

wherein $X_{max}$ and $X_{min}$ are the values of the variables constituting the limits of the experimental range and Bg and BI are the boundaries of the calculation.

If the calculation is strictly limited to the experimental range, D=1. It is possible in the same manner to investigate solutions closer to the center (D<1) or extrapolate with D>1.

It follows from the above that in a simplified form (the case in which no nested hyperboles are created and only the $2^k$ vertices of the different hypercubes are calculated) A1 may be expressed as follows (A2):

$$u_i = c_i + \frac{1}{2^R} \cos\left[E\frac{n-1}{2^{i-1}} \cdot \pi\right]$$

Similarly, if the nested hypercubes are formed by retaining only the vertices of said hypercubes (2 points per edge), the algorithm may be written (A3):

$$u_i = c_i + \frac{1}{2^R} \cdot \frac{1}{N}\left[E\frac{n-1}{2^k} + 1\right] \cdot \cos\left[E\frac{n-1}{2^{i-1}} \cdot \pi\right]$$

Likewise, if it is desired to investigate only the effect of a very large number of variables by examining only the boundaries of the experimental range, conducting $2^k$ calculations, the algorithm (A4) may be used:

$$u_i = \cos\left[E\frac{n-1}{2^{i-1}} \cdot \pi\right]$$

The symbols in $A_2$, $A_3$ and $A_4$ are as defined above.

It will be appreciated that the optimization of the variable/property relationship may entail either developing one or the exact solution (the case wherein the number of properties is equal to or less than the number of variables), or developing the best compromise (the case wherein the number of properties is greater than the number of variables).

The determination of the present invention will become apparent from the accompanying Figures of Drawing.

The problem presented is the determination of the best couple of variable $V_1$ and $V_2$ making it possible to obtain two properties having, respectively, the values of $P_1^* = 50$ and $P_2^* = 15$ (desired values).

Figure 2:
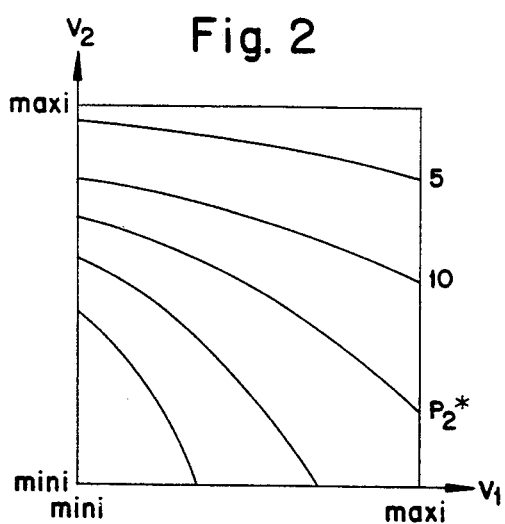
Figure 3:
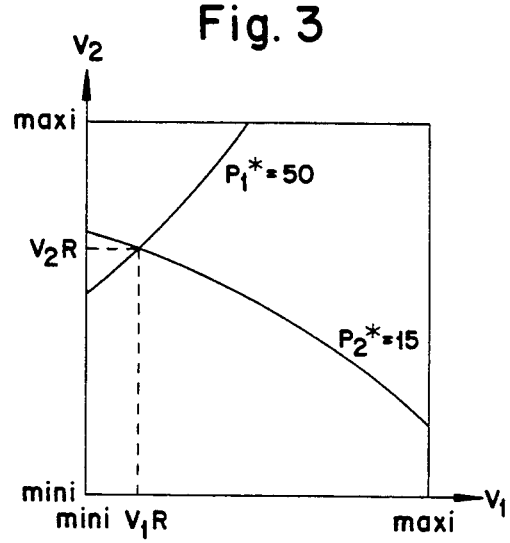

FIGS. 1 to 3 are presented for the purposes of comparison, using conventional calculations.

In FIG. 1, curves of the level of P1 as a function of $V_1$ and $V_2$ are indicated; it is found that there exist a large number of $V_1$ and $V_2$ couples yielding $P_2^* = 50$.

FIG. 2 illustrates the curves of the level of $P_2$ and it is again seen that a plurality of couples yield $P_2^* = 15$. The superposition of FIGS. 1 and 2 (FIG. 3) permits establishing the values of $V_1R$ and $V_2R$ leading to the desired result.

It is found, on the one hand, that the establishment of the various value curves requires a great number of calculations, and, on the other, that this procedure is increasingly difficult to carry out with increasing numbers of variables, and the superposition of a large number of curves is impossible.

FIGS. 4 to 8 illustrate the technique according to the invention.

Figure 4:
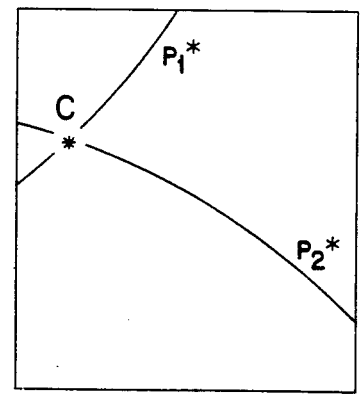
FIGS. 4 to 8 illustrate a calculation technique according to the invention.

FIG. 4 depicts the values selected ($P_1^* = 50$; $P_2^* = 15$); (point C).

Figure 5:
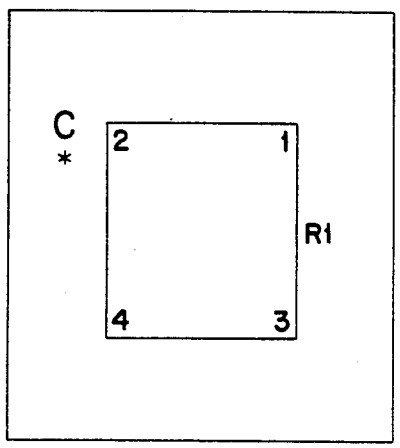
Figure 6:
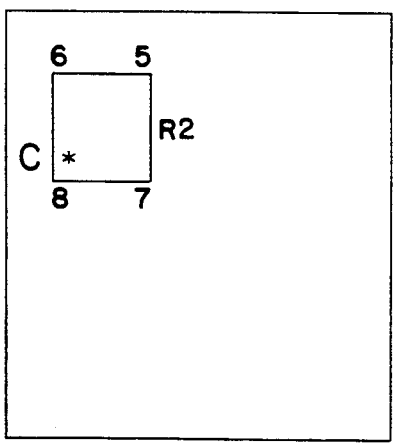
Figure 7:
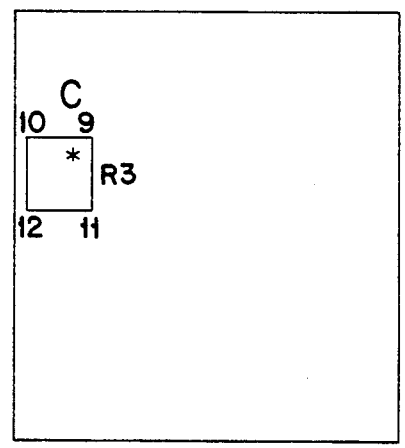

FIG. 5 illustrates the first stage of the calculation; with the square representing the experimental range, the values of the properties are calculated for four points located at mid-distance between the center of the range and the four vertices of the square. They are compared with the properties desired (C) and the solution closest to C is retained.

In the second stage (FIG. 6), the starting point is the best solution determined in the preceding stage (vertex of the square nearest to C) and the calculation is repeated with the step of the preceding calculations divided by 2. A new square is formed, one of the vertices of which is closer to C than in the second stage.

In the third stage (FIG. 7), the calculation is repeated beginning at the new vertex retained and with the step of the calculation again divided by 2.

Figure 8:
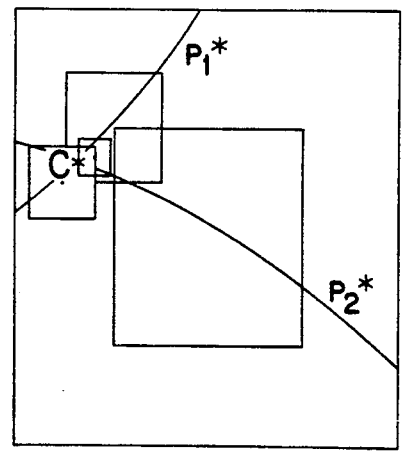

FIG. 8 illustrates the overall algorithm, by representing 4 iterations, with the realization that 9 iterations would make it possible to provide a precision of $10^{-3}$.

FIGS. 9 and 10 are representations of nested cubes (FIG. 9) and scan the centers of the edges and the centers of the faces (FIG. 10).

The technique for determining the optimal variables/properties relationship as defined above, employing the succession of hypercubes and, more precisely the algorithms ($A_1$, $A_2$, $A_3$ or $A_4$), permits, as set forth above, providing said optimum relationship, by establishing, by design, the range of the computation and the number of calculations, i.e., the time required to obtain the result desired. Purely by way of example, using the microprocessor hereinbefore indicated, the consideration of 4 variables requires a computing time of 8 seconds (compared with 1,600 years), always with a precision of $10^{-3}$. The total number of elementary calculations is given by the general formula:

$$Q = R_{max} \cdot N \cdot p^k$$

wherein $R_{max}$ represents the number of iterations (for example $R_{max}=9$ corresponds to a precision of $10^{-3}$ in the variation over the range), with N, p and k being as defined above.

The technique of the present invention may be used in a wide variety of fields and industrial applications, whether processes are to be carried out, compositions or formulations prepared, manufacturing conditions or the treatment of different materials optimized, or the effect of impurities studied, for example, in spectroscopic analysis, or the conversion of various products, for example plastics, facilitated by optimizing the parameters of control or regulation of an extruder vis-a-vis the extrusion properties desired.

In order to further illustrate the present invention and the advantages thereof, the following specific examples are given, it being understood that same are intended only as illustrative and in noise limitative.

EXAMPLE 1

This example relates to the production of a colorant having a gray tint, the trichromatic coordinates of which have the following values:
L=63: L=brightness varying from 0 (black) to 100 (white)
a=−2.05: a=green-red axis (−; +)
b=−3.83: b=blue-yellow axis (−; +)

Such a tint was produced by mixing together two pigments: one black and one blue,.

To rapidly attain the desired result, a scheme $2^2$ was carried out employing the following values:
black pigment:
  minimum value (−1)=50 ppm
  maximum value (+1)=500 ppm
blue pigment:
  minimum value (−1)=200 ppm
  maximum value (+1)=2,000 ppm
for each condition of the experiment, the values of the three properties concerned were measured;

| Test | Black (N) | Blue (B) | L | a | B |
|---|---|---|---|---|---|
| 1 | − | − | 66.01 | −1.27 | −0.87 |
| 2 | − | + | 62.88 | −3.25 | −7.01 |
| 3 | + | − | 53.27 | −0.55 | −0.41 |
| 4 | + | + | 51.24 | −1.44 | −2.96 |

Conventional calculation beginning with the experimental scheme, provided the three models set forth below; they are presented as below to indicator that they are coded explanatory variables:

$$L = 58.35 - 6.095\,n - 1.290\,b + 0.275\,nb$$

$$a = -1.63 + 0.633\,n - 0.718\,b + 0.273\,nb$$

$$b = -2.81 + 1.128\,n - 2.173\,b + 0.898\,nb$$

It will be seen that each of the trichromatic components was affected by the two pigments used. As there were three properties involved for two variables, it will also be seen that no exact solution exists (this follows from the superposition the three isorepsonses intended, plotted in FIG. 11—the arrow point designates the desired result).

The optimization calculation, carried out in 2 seconds, provided the best solution using only 36 calculations ($R_{max}=9$, N=1, p=2 and k=2):

|   | Desired value | Compromise value |
|---|---|---|
| L | 63 | 62.895 |
| a | −2.05 | −2.110 |
| b | −3.83 | −3.684 |

It was determined that, relative to the calculation, the least objectionable solution was acceptable, as it produced a color having a deviation ΔE=0.19, and the human eye is not sensitive enough to perceive such a difference.

The values of the variables calculated by the technique of the invention, respectively 69 ppm for the black and 1,257 ppm for the blue, were used to produce the tinted colorant; it was judged acceptable by color scientists.

EXAMPLE 2 the procedure of Example 1 was repeated, to produce a colorant defined by the trichromatic coordinates:
L=50.44
a=27.24
b=29.21

Three pigments were used to produce the tint desired (deep maroon), with the following minimum and maximum proportions:

|   | Minimum proportion | Maximum proportion |
|---|---|---|
| Black | 10 ppm | 30 ppm |
| Red | 200 ppm | 400 ppm |
| Yellow | 500 ppm | 1000 ppm |

In light of the expense of experiments entailing mixing, granulation and malaxation on cylinders it was sought to reduce them as much as possible and a fractional scheme $2^{(3-1)}$ was carried out with the following results:

| Test | N | R | J | L | a | b |
|---|---|---|---|---|---|---|
| 1 | + | + | + | 47.27 | 24.31 | 25.62 |
| 2 | + | − | − | 52.49 | 21.68 | 28.30 |
| 3 | − | − | + | 56.90 | 31.21 | 40.10 |
| 4 | − | + | − | 52.45 | 34.96 | 29.24 |

Modelization provided the coded equations:

$$L = 52.28 - 2.40\,n - 2.42\,r - 0.19\,j$$

$$a = 20.04 - 5.05\,n + 1.59\,r - 0.28\,j$$

$$b = 30.82 - 3.85\,n - 3.39\,r - 2.04\,j$$

In the optimization calculation, it was assumed that $p=3$ and $N=3$ in order to attain a greater precision of computation; by 729 elementary calculations, the following results were obtained:

|   | Intended values | Calculated values |
|---|---|---|
| L | 50.44 | 50.435 |
| a | 27.24 | 27.238 |
| b | 29.21 | 29.214 | the quantities of pigments required to produce the desired colorant, following the optimization calculation, were the approximate values:
Black: 23 ppm
Red: 345 ppm
Yellow: 871 ppm The actual preparation yielded a result very close to the desired values:
L = 50.45
a = 27.18
b = 28.81

The calculation was continued by developing the red axis only, with the two other trichromatic coordinates remaining constant:

| Values desired | | | Values determined | | | | | |
|---|---|---|---|---|---|---|---|---|
| L | a | b | L | a | b | N | R | J |
| 50.44 | 25.5 | 29.21 | 50.539 | 25.515 | 29.029 | 25 | 316 | 848 |
| " | 26.0 | " | 50.440 | 26.000 | 29.210 | 25 | 326 | 879 |
| " | 26.5 | " | 50.440 | 26.499 | 29.210 | 24 | 334 | 875 |
| " | 27.0 | " | 50.440 | 27.001 | 29.211 | 23 | 341 | 871 |
| " | 27.5 | " | 50.440 | 27.499 | 29.211 | 22 | 349 | 861 |
| " | 28.0 | " | 50.440 | 27.998 | 29.209 | 21 | 356 | 863 |
| " | 28.5 | " | 50.514 | 28.503 | 29.070 | 21 | 361 | 859 |
| " | 29.0 | " | 50.460 | 28.998 | 29.170 | 20 | 370 | 847 |

Examination of the above table indicates that in order to produce the desired colorant, i.e., increasing the value of a only from 26 to 28.5, it is necessary to simultaneously:

(i) decrease the amount of black pigment from 25 to 21 ppm, (ii) increase the amount of red pigment from 326 to 361 ppm, (iii) decrease the amount of yellow pigment from 879 to 859 ppm (if it is desired to remain within the experimental range). Beyond the limits circumscribed by $26 < a < 28.5$, the optimization calculation evidenced that no exact solution existed within the experimental range.

It should be noted that such a tint is difficult to obtain, because the minimum variations of the pigments will alter the tint beyond that which is detected by the human eye, which perceives a difference of 0.5 of a, which corresponds to the following variations:
Black: about 1 ppm (4%)
Red: about 7 ppm (2%)
Yellow: about 4 ppm (0.5%)

Plotting the isoresponse curves (FIG. 12) for the original objective, in the Black - Red plane for yellow = 870 ppm, well illustrates both of the following:

(1) the sensitivity of the tint to small variations in concentration, (2) the necessity for calculating with extreme precision, because the angle between the planes b and L is small.

EXAMPLE 3

In order to optimize four properties of a coated fabric, a testing scheme involving three variables was developed:

A = percentage of the treating additive
T = temperature of the treatment
H = humidity of the fabric to be treated.

The following properties were to be optimized:
ADH = adherence of the coating
DCH = fabric strength in the warp direction
DTR = fabric strength in the weft direction
RF = friction strength (note 20).

To simplify the technique, the actual values of the variables were replaced by their coded values ($-1$, $+1$).

Experimental scheme and results obtained

| VARIABLES | | | PROPERTIES | | | |
|---|---|---|---|---|---|---|
| A | T | H | ADH | DCH | DTR | RF |
| +1 | −1 | −1 | 5.3 | 1.00 | 1.08 | 14 |
| −1 | −1 | −1 | 5.6 | 1.15 | 1.40 | 4 |
| +1 | +1 | −1 | 7.3 | 0.90 | 1.18 | 18 |
| −1 | +1 | −1 | 6.0 | 1.18 | 1.40 | 12 |
| +1 | −1 | +1 | 8.2 | 0.95 | 1.30 | 12 |
| −1 | −1 | +1 | 5.7 | 1.20 | 1.55 | 6 |
| +1 | +1 | +1 | 8.5 | 0.85 | 1.30 | 16 |
| − | +1 | +1 | 6.1 | 1.35 | 1.50 | 10 |

From the above table, it will be seen that the maximum valve of each property in each case corresponds to a different combination of variables.

Increasingly effective solutions will be developed successively for the entirety of the four properties measured.

The models established comprised both the principal actions of the variables and their interactions in pairs.

$$ADH = 6.59 + 0.74\,a + 0.39\,t + 0.54\,h + 0.19\,at + 0.49\,ah = 0.21\,th$$

$$DCH = 1.07 - 0.15\,a - 0.003\,t + 0.016\,h - 0.047\,at - 0.041\,ah + 0.016\,th$$

$$DTR = 1.34 - 0.12\,a + 0.006\,t + 0.074\,h + 0.018\,at + 0.012\,ah - 0.018\,th$$

$$RF = 11.5 + 3.5\,a + 2.5\,t - 0.5\,h - 0.5\,at - 0.5\,ah - 0.5\,th.$$

The following Table reports the results of the different calculations for the successive objectives.

In order to verify the coherence of the data, optimization for the mean values was also calculated, said mean values being identical with the constants of the preceding centered equations. It was found in this case that the value of all of the variables was equal to 0.

| Values desired | | | | Values determined | | | | VARIABLES | | |
|---|---|---|---|---|---|---|---|---|---|---|
| ADH | DCH | DTR | RF | ADH | DCH | DTR | RF | A | T | H |
| 5 | 0.9 | 1.0 | 6 | 5.5 | 1.04 | 1.14 | 11.8 | 0.63 | −1 | −1 |
| 5.5 | 0.95 | 1.05 | 8 | 5.5 | 1.04 | 1.14 | 11.8 | 0.63 | −1 | −1 |
| 6 | 1.0 | 1.1 | 10 | 5.8 | 1.02 | 1.15 | 12.1 | 0.72 | −1 | −0.75 |
| 6.5 | 1.05 | 1.15 | 12 | 6.3 | 1.00 | 1.18 | 12.5 | 0.84 | −1 | −0.33 |
| 7 | 1.1 | 1.2 | 14 | 6.6 | 1.01 | 1.26 | 14.3 | 0.24 | 0.53 | −0.75 |
| 7.5 | 1.15 | 1.25 | 15 | 7.1 | 1.04 | 1.33 | 14.4 | 0.13 | +1 | 0 |
| 8 | 1.2 | 1.3 | 16 | 7.4 | 1.06 | 1.37 | 13.6 | 0.14 | +1 | 0.72 |
| 8.5 | 1.25 | 1.35 | 18 | 7.5 | 1.06 | 1.38 | 13.4 | 0.18 | +1 | 1 |
| 9 | 1.3 | 1.4 | 20 | 7.6 | 1.05 | 1.38 | 13.5 | 0.21 | +1 | 1 |
| | | | | Mean values | | | | | | |
| 6.58 | 1.07 | 1.34 | 11.5 | 6.58 | 1.07 | 1.34 | 11.5 | 0 | 0 | 0 |

The following practical conclusions may be drawn from the Table, if it is desired to improve the entirety of the four properties simultaneously:

(1) relative to the variables:
(i) little additive should be added,
(ii) the treatment temperature should be increased,
(iii) maximum humidity should be maintained throughout the operation.

(2) relative to the properties, it is noted:
(i) the tear strength in the warp direction remains practically constant,
(ii) it is possible to simultaneously increase the tear strength in the weft direction and adhesion; for these properties, the maximum experimental values can be approached. The same is not true for friction resistance, which is limited to a value of 13.5 as the result of the compromise sought.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A method of optimizing operating conditions in a process comprising:
performing a process wherein variables of the process affect properties of a product produced by said process, said variables being varied by adjusting one or more operating conditions of said process;
determining the optimum variable/property relationship in said process, said process including k variables X affecting p properties Y, comprising:
(a) establishing response equations from an experimental scheme and/or by the analysis of the given data:

$$Yj = f(u_i),$$

(b) selecting a value $Yj^*$,
(c) calculating the minimum value of $$\delta^2 = \sum_1^j (vj - vj^*)^2$$

wherein Yj is the numerical value of the property Y of number j, $Yj^*$ is the weighted value of Yj (intended value), $\underline{Y}j$ is the weighted value of $\underline{Y}j$ provided by the regression model $f(u_i)$, $vj^*$ is the coded weighted value of $Yj^8$, $vj$ is the coded weighted value of $\underline{Y}j$, $u_i$ is the coded weighted value of the variable with the numerical value X of said number i ($X_i$), said weightings having been obtained by the equations:

$$vj = 2 \frac{Yj - \overline{Y}j}{Y\max - Y\min}$$

and $$u_i = 2 \frac{Xi - \overline{X}i}{X\max - X\min}$$

with $\overline{Y}j$ designating the mean value of the property and $\overline{X}i$ the mean value of the variable, Y max and Y min designating the actual extreme values of said properties over the experimental range, X max and X min designating the actual extreme values of the variables over the experimental range, Yj designating the actual value of the property and Xi the actual value of the variable, and
creating a hypercube of coded variables constituting the experimental range, calculating vj for the values of $u_i$ corresponding to the $2^k$ vertices of the hypercube, the dimensions of which are a fraction of the dimensions of the variables coded in the initial step of the procedure, then calculating $\delta^2$, with the vertex yielding the lowest value of $\delta^2$ defining the center of a new hypercube, the dimensions of which being a fraction of the dimensions of the preceding hypercube, and repeating such calculations until the minimum value of $\delta^2$ is obtained, and
adjusting at least one of said operating conditions in said process as a function of the optimum variable/property relationship thus determined whereby said relationship is used for optimizing said process.

2. The method as defined by claim 1, wherein the hypercube of the experimental range is dimensioned −1, +1, the first hypercube of the calculation is dimensioned −½, +½, the second −¼, +¼ and the latter hypercubes are similarly geometrically dimensioned.

3. The method as defined by claim 1, wherein the successive values of $u_i$ are calculated by means of the algorithm $A_1$:

$$u_i = c_i + \frac{D}{2^R} \cdot \frac{1}{N} \left[ E \frac{n-1}{p^k} + 1 \right] \cdot$$

$$\cos\left[ \left( E \frac{n-1}{p^{i-1}} + (p-2) E \frac{n-1}{p^i} \right) \cdot \frac{\pi}{p-1} \right]$$

wherein $C_i$ designates the coordinates of the center of the hypercube R, at which the calculations are carried out, $D/2^R$ designates the amplitude of the partial calculation in the iteration of the order R, with D representing the distance of the calculation from the center of the experimental hypercube, R corresponding to the order of the successive iterations and therefore having the values of 1, 2, 3 ... $R_{max}$;

$$\frac{1}{N}\left[E\frac{n-1}{p^k}+1\right]$$

designates the dimensioning of the nested hypercubes in the space R, and N designating the number of nested hypercubes, E indicating that only the integer portion of the succeeding fraction is retained, k designating the number of variables considered, n representing the step of calculation in each hypercube R and ranging from 1 to $Np^k$, and p designating the number of points calculated at each edge of the hypercube;

$$\cos\left[\left(E\frac{n-1}{p^i-1}+(p-2)E\frac{n-1}{p^i}\right)\ast\frac{\pi}{p-1}\right]$$

designating the coordinates of each point investigated in the nested hypercubes, E being as defined above and i designating the number of the variable, ranging from 1 to k.

4. The method as defined by claim 3, wherein the successive values of $u_i$ are determined according to algorithm $A_2$:

$$u_i = c_i + \frac{1}{2^R}\cos\left[E\frac{n-1}{2^{i-1}}\ast\pi\right].$$

5. The method as defined by claim 3, wherein the successive values of $u_i$ are determined according to the algorithm $A_3$:

$$u_i = c_i + \frac{1}{2^R}\ast\frac{1}{N}\left[E\frac{n-1}{2^k}+1\right]\ast\cos\left[E\frac{n-1}{2^{i-1}}\ast\pi\right].$$

6. The method as defined by claim 3, wherein the successive values of $u_i$ are determined according to algorithm $A_4$:

$$u_i = \cos\left[E\frac{n-1}{2^{i-1}}\ast\pi\right].$$

* * * * *